(12) United States Patent
Baker et al.

(10) Patent No.: US 11,715,592 B2
(45) Date of Patent: Aug. 1, 2023

(54) SAMARIUM COBALT AND NEODYMIUM IRON BORIDE MAGNETS AND METHODS OF MANUFACTURING SAME

(71) Applicant: Lawrence Livermore National Security, LLC, Livermore, CA (US)

(72) Inventors: Sarah Baker, Dublin, CA (US); Joshua Kuntz, Livermore, CA (US); Scott K. Mccall, Livermore, CA (US); Christine A. Orme, Oakland, CA (US); Alexander A. Baker, Pleasanton, CA (US); Jonathan R. I. Lee, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 979 days.

(21) Appl. No.: 16/121,561

(22) Filed: Sep. 4, 2018

(65) Prior Publication Data

US 2020/0075237 A1    Mar. 5, 2020

(51) Int. Cl.
| | | |
|---|---|---|
| *H01F 41/02* | (2006.01) | |
| *H01F 1/055* | (2006.01) | |
| *H01F 1/057* | (2006.01) | |
| *C22C 19/07* | (2006.01) | |
| *H02K 1/02* | (2006.01) | |

(52) U.S. Cl.
CPC ......... *H01F 41/0266* (2013.01); *C22C 19/07* (2013.01); *H01F 1/0551* (2013.01); *H01F 1/0556* (2013.01); *H01F 1/0576* (2013.01); *C22C 2202/02* (2013.01); *H02K 1/02* (2013.01)

(58) Field of Classification Search
CPC .. H01F 41/0266; H01F 1/0551; H01F 1/0556; H01F 1/0576; H01F 41/0273; C22C 19/07; C22C 2202/02; H02K 1/02
See application file for complete search history.

(56) References Cited

U.S. PATENT DOCUMENTS

| | | | | |
|---|---|---|---|---|
| 5,064,465 | A * | 11/1991 | Chen | H01F 1/0573 75/349 |
| 2006/0070491 | A1* | 4/2006 | Yang | B22F 1/025 75/255 |
| 2012/0328467 | A1* | 12/2012 | Fernandez Acevedo | C22C 28/00 420/83 |
| 2016/0172085 | A1* | 6/2016 | Arnold | C23C 18/50 438/3 |
| 2019/0198207 | A1* | 6/2019 | Maehara | H01F 1/0558 |

OTHER PUBLICATIONS

Okabe et al., "Titanium powder production by preform reduction process (PRP)", Feb. 11, 2004, Journal of Alloys and Compounds, vol. 364 issues 1-2, pp. 156-163 (Year: 2004).*
Poudyal et al., "Advances in nanostructured permanent magnets research," Journal of Physics D: Applied Physics, vol. 46, 2013, 24 pages.

(Continued)

*Primary Examiner* — Keith Walker
*Assistant Examiner* — Adil A. Siddiqui
(74) *Attorney, Agent, or Firm* — Zilka-Kotab, P.C.

(57) ABSTRACT

In one embodiment, a magnet includes a three-dimensional structure with nanoscale features, where the three-dimensional structure has a near net shape corresponding to a predefined shape.

22 Claims, 6 Drawing Sheets

(56) References Cited

OTHER PUBLICATIONS

Hou et al., "A Facile Synthesis of SmCo5 Magnets from Core/Shell Co/Sm2O3 Nanoparticles," Advanced Materials, vol. 19, 2007, pp. 3349-3352.
Pascall et al., "Light-Directed Electrophoretic Deposition: A New Additive Manufacturing Technique for Arbitrarily Patterned 3D Composites," Advanced Materials, vol. 26, 2014, pp. 2252-2256.
Kneller et al., "The Exchange-Spring Magnet: A New Material Principle for Permanent Magnets," IEEE Transactions on Magnets, vol. 27, No. 4, Jul. 1991, pp. 3588-3600.
Strnat et al., "Rare earth-cobalt permanent magnets," Journal of Magnetism and Magnetic Materials, vol. 100, 1991, pp. 38-56.
Givord et al., "The physics of coercivity," Journal of Magnetism and Magnetic Materials, 2003, pp. 1-5.
Zhang et al., "Chemical synthesis of hard magnetic SmCo nanoparticles," Journal of Materials Chemistry, vol. 21, 2011, pp. 16873-16876.
Ye et al., "Highly Efficient Materials Assembly via Electrophoretic Deposition for Electrochemical Energy Conversion and Storage Devices," Advanced Energy Materials, 2016, 15 pages.
Liu et al., "Building Nanocomposite Magnets by Coating a Hard Magnetic Core with a Soft Magnetic Shell," Angewandte Chemie International Edition, vol. 53, 2014, pp. 2176-2180.
Jia et al., "Preparation of Titanium Powders from TiO2 by Calcium Vapor Reduction," JOM, vol. 65, No. 5, 2013, pp. 630-635.
Gutfleisch et al., "Magnetic Materials and Devices for the 21st Century: Stronger, Lighter, and More Energy Efficient," Advanced Materials, vol. 23, 2011, pp. 821-842.
Coey, J. M. D., "Hard Magnetic Materials: A Perspective," Advances in Magnetics, IEEE Transactions on Magnetics, Dec. 2011, pp. 4671-4681.
Chinnasamy et al., "Direct chemical synthesis of high coercivity air-stable SmCo nanoblades," Applied Physics Letters, vol. 93, Jul. 2008, 3 pages.
Anonymous, "Elements in short supply," Nature Materials, vol. 10, Mar. 2011, pp. 157.
Jones, N., "The Pull of Stronger Magnets," Nature, vol. 472, Apr. 2011, pp. 22-23.
Yang et al., "Single Domain SmCo5@Co Exchange-coupled Magnets Prepared from Core/shell Sm[Co(CN)6]-4H20@GO Particles: A Novel Chemical Approach," Scientific Reports, Dec. 20, 2013, pp. 1-7.
Ormerod, J., "Bonded Magnets: A Versatile Class of Permanent Magnets," Magnetics Business & Technology, Summer 2015, pp. 8-11.

* cited by examiner

SAMARIUM COBALT AND NEODYMIUM IRON BORIDE MAGNETS AND METHODS OF MANUFACTURING SAME

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to samarium cobalt and neodymium iron boride magnets, and more particularly, this invention relates to methods of manufacturing samarium cobalt and neodymium iron boride magnets.

BACKGROUND

Permanent magnets are central to modern technology by being essential for energy efficient, lightweight devices such as cell phones, ear buds, and laptops, and being essential in large quantities (e.g. kilogram to ton quantities) for high efficiency and renewable energy applications such as wind turbines, electric drive, and hybrid motors. The use of permanent magnets in electric motors allows higher efficiency in a significantly smaller mass and volume. Moreover, high energy products that are maintained at high temperatures, e.g. electric motors, utilize a class of permanent magnets that include Samarium Cobalt ($SmCo_5$) magnets. In the United States, electric motors consume approximately 15% of total electricity usage. Thus, even small increases in electrical motor efficiency have a sizable impact on reduced energy costs and reduced $CO_2$ emissions. For example, a 1% efficiency improvement translates into savings of hundreds of millions of dollars and a reduction of 2.2 million metric tons of $CO_2$ emissions.

Permanent magnets may be graded for merit according to a measure of $(BH)_{max}$ energy product which represents maximum useable energy stored in the magnet. The energy product is a combination of the remanent magnetization ($M_r$), a measure of the average magnetism (total magnetic moment divided by the volume of the magnet), and the coercivity ($H_e$), a measure of the resistance to becoming demagnetized. High coercivity at ambient room temperature is important for motor applications because coercivity tends to decline with temperature in conventional magnets. A magnet with high coercivity would enable optimal coercivity at elevated temperatures. Progress in magnetic materials over the past century has been ascribed to a mastery of high coercivity and the related magnetocrystalline anisotropy. Conventional magnets with high coercivity are typically composed of rare earth element-transition metal (RE-TM) materials, where the orbital electron structure contains unpaired electrons in the 4f subshell (4f electrons) that may contribute to high magnetocrystalline anisotropy of the RE-TM, and contains electrons in the 3d subshell (3d electrons) that may contribute to high magnetization and Curie temperature of the RE-TM. Typically the realized coercivity of conventional magnets reaches only 25-30% of the maximum achievable coercivity, after a long optimization of the magnetic microstructure. Moreover, ideally, magnetic material would possess a high coercivity at working temperatures for motor applications which run at temperatures greater than 150° C.

Currently the only two high energy product magnetic materials are suitable for motor applications and are based on RE-TM materials: Neodymium Iron Boride ($Nd_2Fe_{14}B$ or Nd—Fe—B) often doped with Dy or Tb, and Samarium cobalt ($SmCo_5$ or $Sm_2Co_{17}$) frequently alloyed with small amounts of Fe, vanadium (V), nickel (Ni), and copper (Cu). Nd—Fe—B magnets, the most widely used permanent magnet material, are used in large quantities in hybrid and electric drive motors. However, many critical materials in these permanent magnets are expensive and susceptible to supply disruption. For example, critical rare earth elements Sm, Nd, and Dy, which provide increased energy efficiencies of Nd—Fe—B and $SmCo_5$ magnets, are mined primarily in China. Therefore, for reasons of national and economic security as well as general efficiency of manufacture, it is desirable to improve manufacturing of the permanent magnets to reduce waste and consumption of the critical materials.

Moreover, methods remain elusive to manufacture permanent magnets with the light REs being naturally available in abundant supply, e.g. SmCo. Conventional permanent magnets tend to rely on heavy REs, e.g. Tb and Dy, to increase the coercivity of Nd—Fe—B magnets for functioning in current motor applications. Magnets based on SmCo have higher environmental stability than Nd—Fe—B magnets. The much higher $T_c$ of SmCo may provide a desirable option for high temperature applications, such as motors and generators.

Moreover, it would also be desirable to minimize waste and cost of REs during the manufacture of magnets as mining for some REs can be environmentally sensitive. Of SmCo formulations, $SmCo_5$, with a hexagonal crystal structure (similar to the crystal structure of CaCO, has the highest known magnetocrystalline anisotropy (and thus very high theoretical coercivity) and a high $T_c$ of 1020 K. It would be desirable to improve the material formulation of $SmCo_5$ permanent magnets as well as the process of manufacturing $SmCo_5$ magnets in order to reduce costs and waste.

Conventional manufacturing of permanent magnets includes a powdered metallurgical process followed by subtractive machining to a desired size. Traditional bulk $SmCo_5$ and Nd—Fe—B based alloys are typically made into permanent magnets following the metallurgical process of sintering pressed powders into large blocks. After heat treatment, these blocks are machined into smaller parts with dicing, grinding, and other mechanical techniques. RE magnets are very brittle and readily chip and fracture, so precision machining of magnets to high tolerances significantly adds to production costs. The debris and waste (e.g. swarf, kerf, etc.) resulting from machining small magnets to their desired size and shape often exceeds 60% of the starting material volume. Thus, machining permanent magnets using a subtractive process results in significant waste of the valuable material.

Designing dies of a specific desired shape for custom magnets, however, is expensive. Designing and producing individual dies can cost up to thousands to tens of thousands of dollars. Moreover, new products often use many different magnet shapes for prototyping, and only using about a hundred prototypes of each shape, so using custom dies for relatively small numbers of magnets can be cost prohibitive.

Alternatively, conventional manufacturing of permanent magnets includes a process of blending magnet material with polymers to make bonded magnets for near net-shape manufacturing of more complex magnet shapes. Bonded magnets have been developed to attempt to overcome the difficulties, wastes, and costs associated with traditional machining of permanent magnets. Bonded magnets are magnet particles combined with a polymer binder that can be extruded, molded, or rolled into sheets and geometric shapes. However, introducing a polymer binder reduces the energy product of the magnet thereby resulting in a larger volume magnet to achieve the same properties as machined magnets. Moreover, the temperature tolerance of bonded magnets may also be reduced compared to machined magnets.

Thus, methods for manufacturing permanent magnets with reduced waste (as typically generated by subtractive machining) and reduced loss of energy (as typically occurs with blending with polymers) have been elusive.

SUMMARY

In one embodiment, a magnet includes a three-dimensional structure with nanoscale features, where the three-dimensional structure has a near net shape corresponding to a predefined shape.

In another embodiment, a method of making a permanent magnet includes forming a three dimensional structure comprising oxidized precursor metal particles, heating the formed three dimensional structure in an atmosphere comprising a calcium vapor and a gas for reducing the oxidized precursor metal particles of the three dimensional structure, and applying a magnetic field to the reduced precursor metal particles of the three dimensional structure.

In yet another embodiment, a method of making a thin foil magnet includes forming a thin foil having a plurality of layers of oxidized precursor metal nanoparticles, reducing the oxidized precursor metal nanoparticles of the thin foil in an atmosphere comprising a calcium vapor and a gas, and applying a magnetic field to the reduced precursor metal nanoparticles of the thin foil. The forming of the thin foil having a plurality of layers of oxidized precursor metal nanoparticles includes forming a first layer of oxidized precursor metal nanoparticles on a substrate, where the oxidized precursor metal nanoparticles are suspended in a solution, evaporating a liquid component of the solution from the first layer of oxidized precursor metal nanoparticles, after the evaporating, forming at least one second layer of oxidized precursor metal nanoparticles above the first layer of oxidized precursor metal nanoparticles, evaporating the liquid component of the solution from the at least one second layer of oxidized precursor metal nanoparticles wherein the thin foil has a plurality of layers of oxidized precursor metal nanoparticles, where the thin foil has a pre-defined thickness.

Other aspects and advantages of the present invention will become apparent from the following detailed description, which, when taken in conjunction with the drawings, illustrate by way of example the principles of the invention.

DETAILED DESCRIPTION

Figure 1:
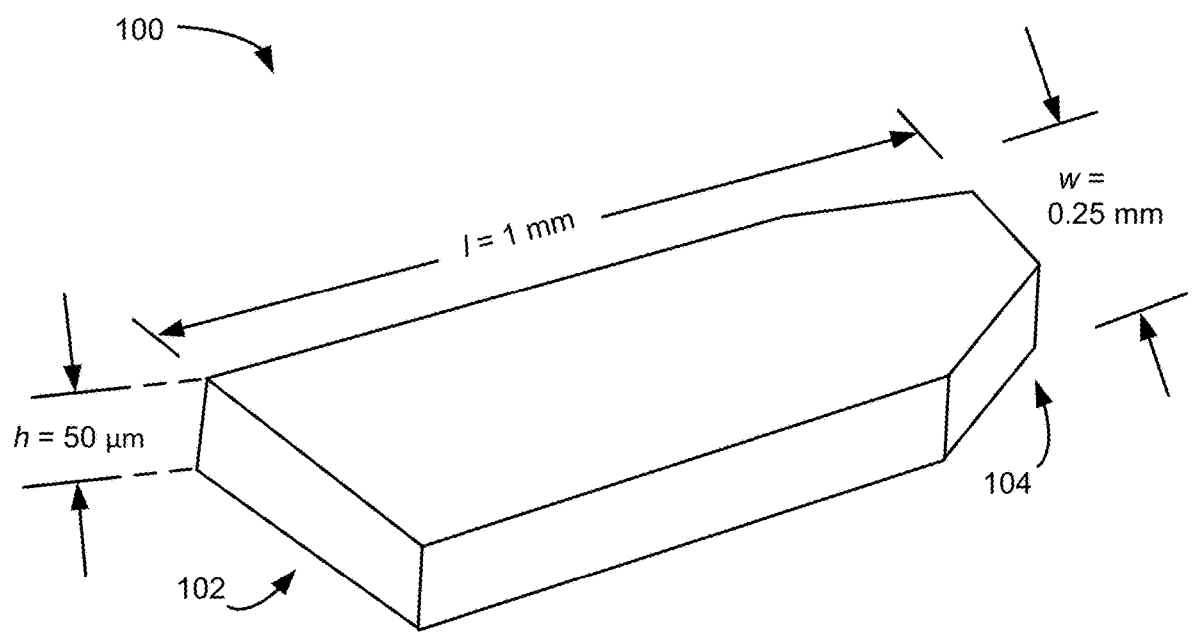
FIG. 1 is a schematic drawing of a thin foil magnet, according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

A nanoscale is defined as having a diameter or length less than 1000 nanometers (nm).

The following description discloses samarium cobalt and neodymium iron boride magnets and/or related systems and methods.

In one general embodiment, a magnet includes a three-dimensional structure with nanoscale features, where the three-dimensional structure has a near net shape corresponding to a predefined shape.

In another general embodiment, a method of making a permanent magnet includes forming a three dimensional structure comprising oxidized precursor metal particles, heating the formed three dimensional structure in an atmosphere comprising a calcium vapor and a gas for reducing the oxidized precursor metal particles of the three dimensional structure, and applying a magnetic field to the reduced precursor metal particles of the three dimensional structure.

In yet another general embodiment, a method of making a thin foil magnet includes forming a thin foil having a plurality of layers of oxidized precursor metal nanoparticles, reducing the oxidized precursor metal nanoparticles of the thin foil in an atmosphere comprising a calcium vapor and a gas, and applying a magnetic field to the reduced precursor metal nanoparticles of the thin foil. The forming of the thin foil having a plurality of layers of oxidized precursor metal nanoparticles includes forming a first layer of oxidized precursor metal nanoparticles on a substrate, where the oxidized precursor metal nanoparticles are suspended in a solution, evaporating a liquid component of the solution from the first layer of oxidized precursor metal nanoparticles, after the evaporating, forming at least one second layer of oxidized precursor metal nanoparticles above the first layer of oxidized precursor metal nanoparticles, evaporating the liquid component of the solution from the at least one second layer of oxidized precursor metal nanoparticles wherein the thin foil has a plurality of layers of oxidized precursor metal nanoparticles, where the thin foil has a pre-defined thickness.

A list of acronyms used in the description is provided below.

3D Three dimensional
Ar Argon
B Boron
$(BH)_{max}$ Maximum energy stored in a magnet C Celsius
cm centimeter
cm$^2$ centimeter squared
Co Cobalt
CO$_2$ Carbon dioxide
Cu Copper
Dy Dysprosium
EPD Electrophoretic deposition
FSP Flame spray pyrolysis
g gram
g/cm$^3$ gram/centimeter cubed, density
H$_c$ coercivity
H$_2$ hydrogen gas
H$_c$ Coercivity
K Kelvin
kOe Kilo oerested
KCl Potassium chloride
DIW Direct ink write
M$_r$ Remnant magnetization
mg milligram
MGOe Mega-Gauss-Oersted
ml milliliter
mm millimeter
Nd—Fe—B Neodymium Iron Boride
Ni Nickel
nm nanometer
Oe oerested
RE-TM rare earth element-transition metal
rpm revolutions per minute
Sm Samarium
SmCo$_5$ Samarium Cobalt
s$^{-1}$ per second
Tb Terbium
T$_c$ Critical temperature
μm micron
V Vanadium
v volts
vol volume Conventional approaches to manufacturing permanent magnets involve subtractive manufacturing methods which result in significant waste of materials and incur excessive costs. Thus, a robust process for a bottom-up or additive manufacturing of permanent magnets, for example, starting from nanoparticle feedstocks is highly desirable.

In contemplated approaches, hard magnetic nanoparticles may form nanocomposite magnets with a high energy product and reduced RE element content. According to various embodiments described herein, the synthesis and controlled assembly of SmCo$_5$-based nanoparticles may enable flexibility in the dimensions and design of the prototype or final part. Moreover, high coercivity of SmCo$_5$-based may be achieved by controlling the nanometer to micron sized grains in the magnet microstructure since coercivity increases with decreasing grain size. However, controlled synthesis of large scale ferromagnetic single domain particles has been an obstacle to manufacturing permanent magnets.

Contemplated approaches to synthesize SmCo nanoparticles have demonstrated problematic drawbacks for use in the manufacture of permanent magnets. Synthesis of reduced SmCo$_5$ nanoparticles from metal salts (e.g. by chemical reducing agents or high temperatures) by direct solution phase synthesis has been challenging due to the extremely negative reduction potential of Sm(1) and the susceptibility of Sm(0) nanoparticles to re-oxidation under synthesis conditions. Alternative approaches to synthesize SmCo nanoparticles have included surfactant-assisted ball milling to deconstruct bulk SmCo to nanoparticles; however, this method lacks the ability to control the resulting particle size or shape of the nanoparticles.

Methods to synthesize SmCo nanoparticles based on traditional thermal decomposition in organic solvents have shown some promise. For instance, sintered SmCo$_5$ can been synthesized from nanoparticles of core-shell Co@Sm$_2$O$_3$ nanoparticles followed by reduction under calcium (Ca) metal with 8 kOe coercivity at 300 K. More recently, coercive SmCo$_5$ nanoparticles, with CaO coatings to prevent sintering, have been synthesized from an oxide using molten Ca as a reductant and KCl as a molten solvent to assist interfacial diffusion. The resulting discrete SmCo$_5$ nanoparticles had a coercivity of 7 kOe at 300 K. However, nanoparticle synthesis based on traditional thermal decomposition in organic solvents can be difficult to scale, and the surfactants used in the process involve additional steps to remove the surfactants prior to reduction. Moreover, aggregation of magnetic particles in solution and in free space pose challenges using additive manufacturing to form bulk magnets from ferromagnetic nanoparticles. Thus, methods for scaling-up and fabricating bulk nanostructured magnets remain elusive.

Various embodiments described herein include a simple, flexible method for manufacturing high coercivity samarium cobalt (SmCo$_5$) and neodymium iron boride (Nd—Fe—B) magnets that may be compatible with additive manufacturing. Moreover, methods described herein do not include adding a polymer binder. Some embodiments describe SmCo$_5$ oxide and Nd—Fe—B particles, as the feedstock for a magnet, deposited into near-net shape parts using additive manufacturing techniques such as electrophoretic deposition (EPD). Various embodiments describe a process of converting oxide nanoparticles, deposited into near net-shape parts, directly to permanent magnets using calcium vapor during annealing.

According to various approaches described herein, oxide particles may be shaped into a nonmagnetic part prior to the process that converts the material into a magnet. It would be advantageous to deposit the oxide particles when the particles are neither air sensitive nor magnetic. Furthermore, the depositing process of the oxide particles may be done at ambient temperature on the bench top in the laboratory.

Embodiments described herein include synthesis of SmCo-based permanent magnets from SmCo$_5$ oxide nanoparticles with room temperature coercivities two to three times larger than coercivities of the best performing commercial magnets. According to some embodiments, the process may begin with large-scale, surfactant-free, tunable synthesis of mixed SmCo oxide nanoparticles using flame spray pyrolysis thereby synthesizing mixed oxide particles in bulk (e.g. tens of grams to kilograms per batch). Moreover, various embodiments demonstrate facile assembly of SmCo nanoparticles from solution phase suspensions using additive manufacturing techniques.

According to various embodiments described herein, a magnet includes a three-dimensional (3D) structure with nanoscale features, where the three-dimensional structure has a near net shape corresponding to a predefined shape. For the purposes of this application, a near net shape is defined that the initial design shape of a structure is close to the final net shape of the structure, less about a 5% change in shape of the initial design. In some approaches, a near net-shape may be defined as a final shape having less than a 1% change in shape of the initial design in smooth structures, such as, for example, but not meant to be limiting, cylinders, cubes, arcs, etc.

A 3D structure may have nanoscale features such as pores, laths, or bars where an average diameter of the features is less than 1000 nm, preferably less than 500 nm, more preferably less than 250 nm. These features may enable backfilling of the microstructure with a second material to improve mechanical properties, such as strength, fracture toughness, etc. Moreover, backfilling 3D structures having nanoscale features with a second material may also improve corrosion resistance, improve the magnetic properties, etc.

In some approaches, features of the 3D structure may represent sintered remnants of the particles that form the 3D structure. In some approaches, nanoscale features of the 3D structure may represent sintered remnants having an average diameter of about a nanoscale range.

In some approaches the magnet may be a permanent magnet. In preferred approaches, the magnet includes a rare earth element that may be a light rare earth element, for example, but not limited to, samarium (Sm), neodymium (Nd), etc. In some approaches, the magnet includes samarium cobalt. In some approaches, the magnet includes neodymium iron boride (Nd—Fe—B). For example, but not meant to be limiting in any way, a Nd—Fe—B magnet may be formed with Sm—Co to provide very high coercivity in selected areas (e.g. corners and edges.)

In some approaches, the permanent magnet formed by methods described herein may have an energy product greater than 5 Mega-Gauss-Oersted (MGOe) to temperatures of at least 200° C.

In some approaches, the magnet may include calcium. In some approaches, the magnet may include elemental calcium. In other approaches, the magnet may include calcium oxide. In yet other approaches, the magnet may include elemental calcium and calcium oxide.

FIG. 1 depicts a structure 100 of a thin foil magnet, in accordance with one embodiment. As an option, the present structure 100 may be implemented in conjunction with features from any other embodiment listed herein, such as those described with reference to the other FIGS. Of course, however, such structure 100 and others presented herein may be used in various applications and/or in permutations which may or may not be specifically described in the illustrative embodiments listed herein. Further, the structure 100 presented herein may be used in any desired environment.

In some approaches, the magnet may be a foil magnet. In some approaches, the foil magnet may be a thin foil magnet. In some approaches, the thickness of the thin foil magnet is in a range of greater than about 500 nanometers and less than about five millimeters. A thickness of a magnet is measured in the z-direction, where the z-direction is perpendicular to an x-y plane. In some approaches, the layers of a thin foil magnet may be deposited on an x-y plane and having a plurality of layers in a z-direction.

As shown in the schematic drawing of a structure 100 in FIG. 1 depicting an example of a thin foil magnet, the dimensions of the thin foil magnet may be arbitrary. For example, the structure 100 may be square at one end 102 with more complicated angles, sides, etc. at the other end 104. Sizes of the thin foil magnet may be in a range for application in micro-robotics, (e.g. less than 1 mm). As shown as an example only and is not meant to be limiting in any way, for structure 100, the height h may be 50 μm, length l may be 1 mm, and width w may be 0.25 mm.

In preferred approaches, a thin foil magnet is formed with a controlled shape and having full density which would be above 90% of the theoretical density (7.7-8.6 g/cm$^3$ for SmCo$_5$ and 7-7.8 g/cm$^3$ for Nd—Fe—B based magnets).

Using calcium vapor reduction methods as described herein, the resulting SmCo$_5$ permanent magnet structure may demonstrate coercivity at room temperature (i.e. the room temperature is between 20° C. and 28° C.) much higher than typical for bulk SmCo$_5$. In some approaches, the magnet coercivity of a SmCo$_5$ permanent magnet at room temperature may be at least 60 kOe. In some approaches, the room temperature coercivity of a bulk cast SmCo$_5$ permanent magnet, as a measurement of demagnetizing field strength, may be nearly 68 kOe. In other approaches, the magnet coercivity of a drop-cast SmCo$_5$ permanent magnet at room temperature may up to 80 kOe.

In sharp contrast to conventional permanent magnets which demonstrate a decline in coercivity linearly with increased temperature, various embodiments described herein demonstrate highly coercive magnets at temperatures higher than current industry limits (around 300° C.). For example, in various embodiments, the magnetic coercivity of SmCo$_5$ permanent magnets may be greater than 10 kOe at temperatures of about 500° C.

According to some embodiments, the permanent magnet may have a high squareness factor. In some approaches, the permanent magnet may perform with a high magnetization and high coercivity at temperatures at least about 500° C., where the coercivity may still exceed 10 kOe. Further, the remnant magnetization may not be significantly reduced at these elevated temperatures making such a magnet useful for motor/generator applications at extreme temperatures. Moreover, a permanent magnet formed from small, refined nanoparticles as described herein provides an opportunity to overcome Brown's paradox that the observed value of magnetism of bulk magnetic material cannot exceed about ⅓ of the theoretical maximum. In other words, the experimental value of magnetism of permanent magnets formed by methods described herein may come closer to the theoretical value of magnetism for the magnet than has previously been achievable.

Figure 2:
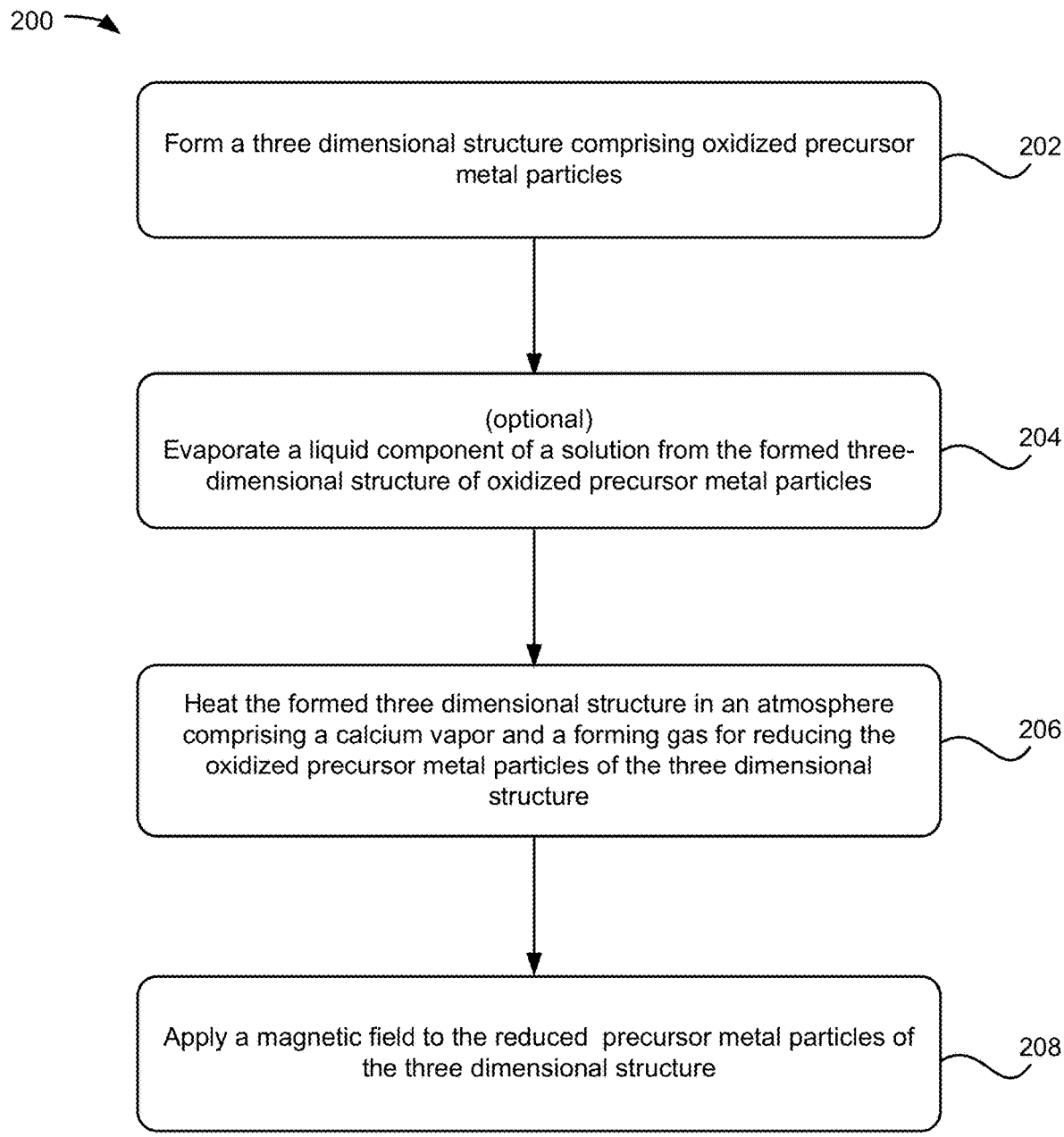
FIG. 2 is a flow chart of a method, according to one embodiment.

FIG. 2 depicts a flowchart for a method 200 for forming a permanent magnet, in accordance with one embodiment. As an option, the present method 200 may be implemented to structures such as those shown in the other FIGS. described herein. Of course, however, this method 200 and others presented herein may be used to form structures for a wide variety of devices and/or purposes which may or may not be related to the illustrative embodiments listed herein. Further, the methods presented herein may be carried out in any desired environment. Moreover, more or less operations than those shown in FIG. 2 may be included in method 200, according to various embodiments. It should also be noted that any of the aforementioned features may be used in any of the embodiments described in accordance with the various methods.

Method 200 begins with step 202 of forming a three dimensional (3D) structure that includes oxidized precursor metal particles. In various embodiments, the precursor metal particles may be precursor metal nanoparticles.

In some approaches of method 200, the precursor metal particles may be oxidized before forming a three dimensional structure. The first step 202 may include a prior step of preparing oxidized precursor metal particles (e.g. SmCo$_5$ oxide, Nd—Fe—B oxide, etc.) for forming a 3D structure on a substrate.

In various embodiments described herein precursor metal particles may be defined as precursor metal material that may not be sensitive to air. The precursor metal particles may not be magnetic before forming a 3D structure. The precursor metal particles may not be magnetic before reducing and annealing the formed 3D structure. In exemplary approaches, precursor metal particles have negligible magnetic properties. Moreover, in the processes described herein, the precursor metal particles may be easily dispersed in solution as compared to the difficulty of dispersing magnetic particles in solution.

In some approaches, step 202 may include forming a 3D structure by dry pressing a powder of the oxidized precursor metal particles.

In other approaches, before forming the three dimensional structure, the method may include suspending oxidized precursor metal particles in a solution. Moreover, step 202 may include forming a 3D structure by depositing oxidized precursor metal particles on a substrate from a solution of suspended the oxidized precursor metal nanoparticles in the solution. In some approaches, the precursor magnet particles may be small enough to create a particle suspension in a solution of solvent.

In some approaches, the liquid component of the solution may be a nonpolar solvent, a polar solvent, etc. In some approaches, the liquid component of the solution may be a combination of nonpolar solvent and a polar solvent. For example, but not meant to be limiting, the liquid component of the solution may be ethanol. In various embodiments the liquid component of the solution is an evaporative solution.

In an exemplary embodiment, the method includes preparing about a solution of precursor $SmCo_5$ oxide particles having an average size in a range of about 20 nm to about 200 nm in diameter. The $SmCo_5$ oxide particles may be synthesized in a bulk quantity using a process of synthesizing of flame spray pyrolysis.

In some approaches, the method to deposit the particles from the solution onto a substrate may include dropcasting such that a solution of particles is dripped onto the substrate and the solution is evaporated from the dropcast form of particles on the substrate.

In some approaches, after forming the three dimensional structure, the method includes evaporating a liquid component of the solution from the formed three dimensional structure of oxidized precursor metal particles.

Various approaches include forming a 3D structure of precursor metal particles that may not be sensitive to air (e.g. oxidization) and may not have magnetic properties, thereby allowing facile and reproducible particle dispersion in suspension, which is optimal for additive manufacturing techniques, for example, but not limited to, electrophoretic deposition (EPD) and direct ink writing (DIW).

In some approaches, the method to deposit the particles from a solution of suspended particles onto a substrate may involve EPD which includes using electric fields to direct and deposit oxidized precursor metal particles above an electrode. Various approaches using EPD allows flexible material synthesis and defined nanoparticle packing density depositing particles on a substrate using electric fields. In some approaches using EPD, the substrate is electrically conductive. In some approaches of EPD, the substrate may be an electrode. In some approaches, the shape of the electrode, substrate, etc. may define the shape of the final magnet part. In various approaches, substrate materials that may be used in a furnace include stainless steel, graphite, molybdenum, etc.

Moreover, in some approaches, an EPD device may include nonplanar electrodes or custom electrodes to form custom shapes during EPD. Thus, permanent magnets with custom shapes may be produced rapidly and inexpensively.

In other approaches, a 3D structure may be formed using DIW, an extrusion technique of additive manufacturing that relies on shear-thinning ink formulations. In some approaches, forming the 3D structure includes extruding an ink including the oxidized precursor metal nanoparticles onto the substrate.

Both EPD and DIW approaches to form a 3D structure on a substrate may facilitate a rapid production of small magnets with thicknesses of several millimeters.

In some approaches, forming the 3D structure includes forming a mold of the oxidized precursor metal nanoparticles in a solution.

As an option, in approaches where precursor metal nanoparticles were suspended in solution for forming the 3D structure on the substrate, step 204 of method 200 includes evaporating the liquid component of the solution from the formed 3D structure of oxidized precursor metal nanoparticles. In some approaches, the 3D structure may be formed on a substrate. In various approaches, the conditions for a slow evaporation of the liquid component of the solution of precursor metal nanoparticles may depend on the liquid component and type of structure, e.g. a thin foil or a 3D structure. For instance, in some approaches in which the precursor nanoparticles are suspended in ethanol, evaporation of the liquid component from a molded structure may involve drying the structure at an elevated temperature (e.g. about 90° C.) for an effective amount of time to evaporate the liquid component of the solution (e.g. about 3 to 5 days). In other approaches of oxidized precursor metal nanoparticles suspended in ethanol, evaporation of liquid component of the solution from a formed structure may involve lyophilization and solvent exchange. In yet other approaches, evaporation of liquid component of the solution from the formed structures of precursor nanoparticles may involve supercritical extraction.

Step 206 of method 200 includes heating the formed 3D structure in an atmosphere including a calcium vapor and a gas for reducing the oxidized precursor metal particles of the 3D structure. In some approaches, the gas may be a forming gas. In some approaches, step 206 includes converting deposited material from step 202 to a reduced pre-magnetic form by heating the deposited material in the presence of calcium vapor and forming gas (for example but not meant to be limiting, 4% hydrogen in argon). In approaches where the 3D structure is formed from a solution of suspended oxidized precursor metal particles, step 206 includes converting dry deposited material from step 204, in which any residual solution, e.g. the liquid component of the solution, in the formed 3D structure has been evaporated, to a reduced pre-magnetic form.

In various approaches, the formed 3D structure may be reduced and annealed by heating (e.g. sintering) in the presence of calcium vapor thereby allowing the sample geometry of the 3D structure to be maintained. In one approach, step 206 of heating the formed 3D structure for reducing and annealing the oxidized precursor metal particles includes heating at a temperature in a range of about 800° C. to about 1000° C. in an atmosphere comprising a calcium vapor and a forming gas.

In various approaches of step 206, there is no direct contact between the oxide particles of the 3D structure and the calcium granules. Furthermore, as understood by one skilled in the art, contacting an oxide particle powder with calcium can have deleterious effects. Studies have shown that heating a mixture of $SmCo_5$ oxide/potassium chloride with solid calcium granules results in a thick layer of melted calcium granules on the substrate of the $SmCo_5$-sintered magnet. Consequently, removing the layer of melted calcium granules from the combined $SmCo_5$-melted calcium magnet product causes the underlying $SmCo_5$ material to break, thereby resulting in increased difficulty to form magnets of a pre-defined size.

Step 206 includes forming the calcium vapor from a bed of calcium granules positioned a distance d from the formed three dimensional structure. The distance d may be greater than zero millimeters (mm). In some approaches, the distance d may be about 2 millimeters. Various embodiments described herein use vapor technique with calcium vapor reduction which allows a clean reduction of the oxide without contact of the calcium granules with the $SmCo_5$ oxide material such that the final part may be ready to use directly after reduction. In addition, the sample geometry of the initial design of the magnet may be maintained in the final product.

In various approaches, the sintering of step 206 may result in sintered remnants of the reduced particles metal particles. In some approaches, sintered remnants may represent features of the 3D structure. The features of the sintered 3D structure may have an average diameter of nanoscale range. For example, the features of the sintered 3D structure may be less than 1000 nm, preferably less than 500 nm, more preferably less than 250 nm.

Figure 3A:
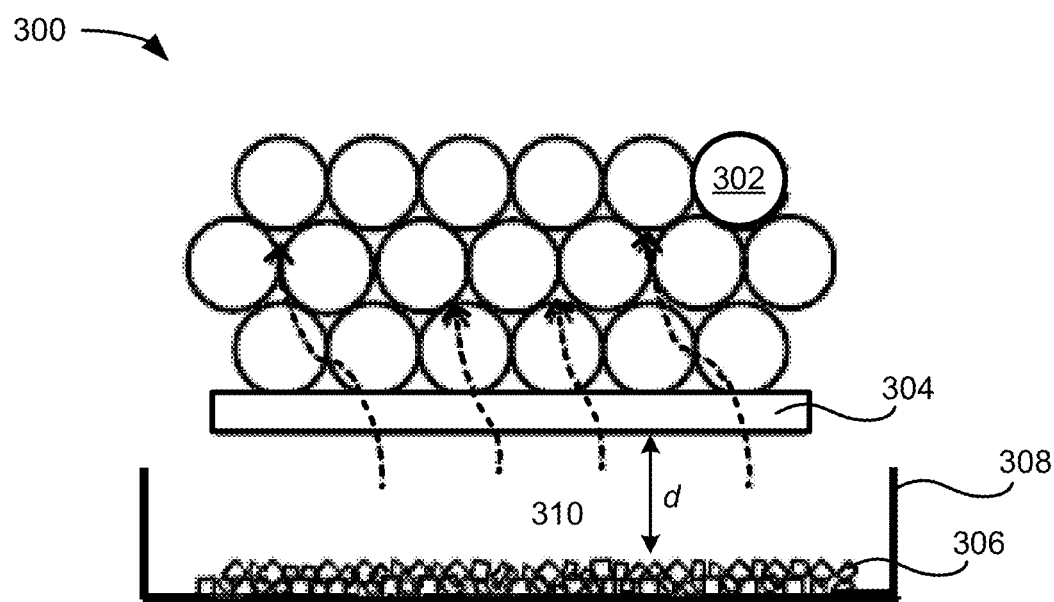
FIG. 3A is a schematic drawing of a reducing operation of a method, according to one embodiment.
Figure 3B:
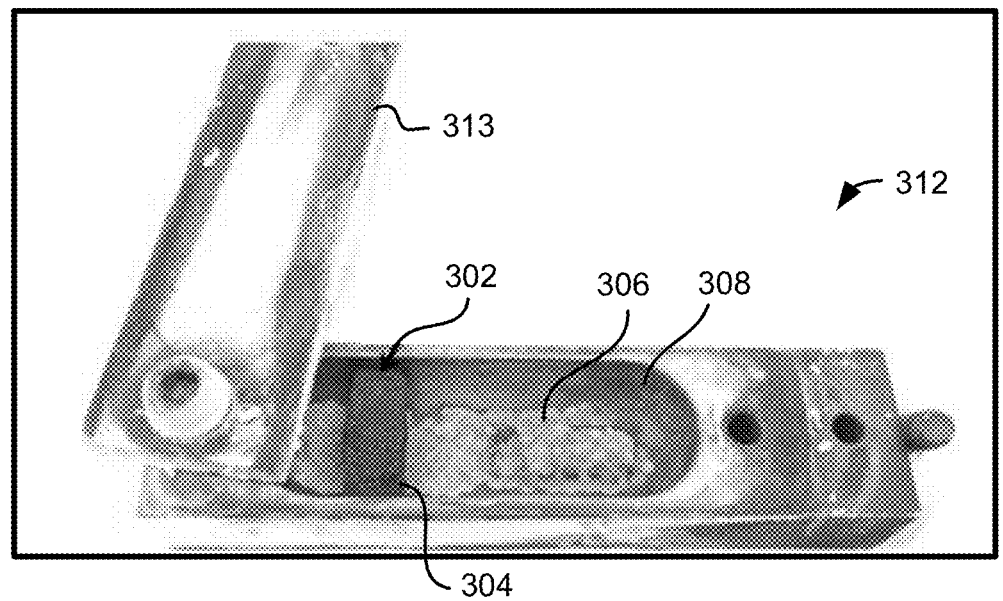
FIG. 3B is an image of a reducing apparatus, according to one embodiment.
Figure 3C:
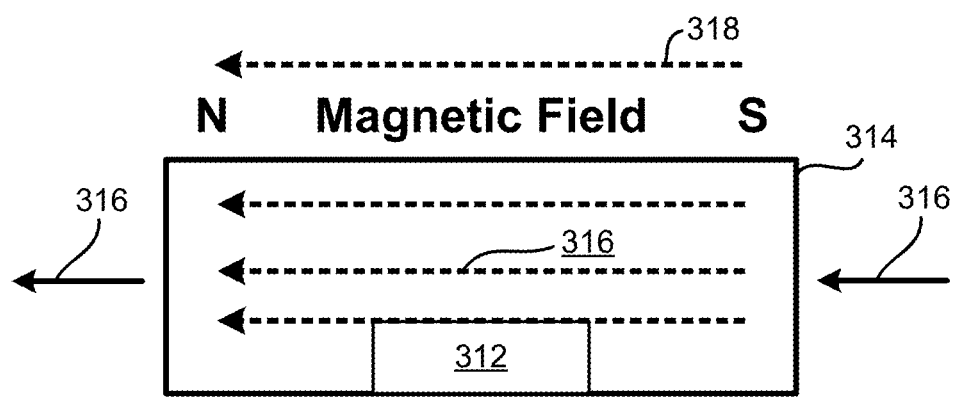
FIG. 3C is a schematic drawing of an annealing operation, according to one embodiment.

FIGS. 3A-3C depicts a series of schematic diagrams for a process 300 for reducing oxidized precursor metal nanoparticles in a formed 3D structure, in accordance with one embodiment. As an option, the present process 300 may be implemented to structures such as those shown in the other FIGS. described herein. Of course, however, this process 300 and others presented herein may be used to form structures for a wide variety of devices and/or purposes which may or may not be related to the illustrative embodiments listed herein. Further, the methods presented herein may be carried out in any desired environment. Moreover, more or less operations than those shown in FIGS. 3A-3C may be included in process 300, according to various embodiments. It should also be noted that any of the aforementioned features may be used in any of the embodiments described in accordance with the various methods.

FIG. 3A illustrates a cross section of the process 300 of calcium vapor reduction, according to one embodiment. As illustrated in FIG. 3A, a sample 302 having a 3D structure of metal oxide powder/nanoparticles deposited on a substrate 304 may be placed above a bed 308 of calcium-based granules 306. It is important to note that the drawing in FIG. 3A represents the components of the process 300 and may not be drawn to scale. In some approaches, the substrate 304 may be a material to support the sample 302 of metal oxide powder/nanoparticles; for example, but not meant to be limiting in any way, the substrate may be graphite, steel mesh, molybdenum, etc.

In some approaches, calcium-based granules 306 may be placed in a bed 308, for example, stainless steel boat, and the sample 302 of metal oxide powder/nanoparticles may be positioned with an air gap between the calcium-based granules 306 and the sample 302 of metal oxide powder/nanoparticles on a substrate 304. In some approaches, the distance d between the calcium-based granules 306 and the substrate 304 may be in a range of about greater than 2 mm to less than about 50 mm. In some approaches, the distance d may be in a range of about greater than 2 mm to less than about 10 mm.

FIG. 3B is a photographic image of a container 312 that may be used in the process 300 of calcium vapor reduction as described in method 200 (FIG. 2). In some approaches, the container 312 includes a hollowed bed 308 for the calcium-based granules 306. In preferred approaches, the sample 302 of metal oxide powder/nanoparticles on a substrate 304 may be positioned at a distance d from the calcium-based granules 306, such that the sample 302 of metal oxide powder/nanoparticles may not make contact with the calcium-based granules 306. In some approaches, the distance d is greater than 0 mm.

In some approaches of step 206 of method 200 (FIG. 2), the lid 313 of the container 312 may be lightly closed over the bed 308 of the container before being placed in the furnace.

In some embodiments, the sample 302 of metal oxide powder/nanoparticles may be reduced and annealed to a metal at elevated temperatures, for example, a temperature in a range of about 800° C. to about 1000° C., in an atmosphere that includes a calcium vapor 310 from the heated calcium granules 306. In preferred approaches, the heating of step 206 of method 200 may occur at least at the temperature of about the melting temperature of calcium. FIG. 3C. illustrates a cross section of the partially closed container 312 as illustrated in FIG. 3B that includes the sample 302 of the metal oxide powder/nanoparticles positioned above a bed 308 of calcium-based granules 306.

As shown in FIG. 3C, the partially closed container 312 may be exposed to the forming gas 316 in a controlled environment 314 (e.g. container, space, etc.). In some approaches, as the forming gas 316 flows across the partially closed container 312, the sample 302 of the metal oxide powder/nanoparticles is exposed to calcium vapor 310 (as illustrated in FIG. 3A) formed from the heated calcium-based granules 306 in the presence of the forming gas 316. In preferred approaches, the flow rate of the forming gas 316 may be determined in a range between being high enough to maintain an atmosphere of the forming gas 316 above the sample but low enough to allow the calcium vapor 310 (FIG. 3A) to contact the sample 302 (e.g. the forming gas should not displace the calcium vapor at the sample).

In some approaches, the forming gas 316 may include an inert gas. In some approaches, the forming gas may be a mixture of hydrogen and an inert gas, usually Ar, He, or $N_2$. In some approaches, $N_2$ may function as an inert gas.

In one approach, the forming gas 316 may be a mixture of argon gas with hydrogen gas. In another approach the forming gas 316 may be a mixture of helium gas with hydrogen gas.

In some approaches, the gas in the atmosphere for reducing the oxidized precursor metal nanoparticles may be argon gas. In other approaches, the gas in the atmosphere for reducing the oxidized precursor metal nanoparticles may be helium gas.

Looking back to FIG. 2, step 208 of the method 200 to form a magnet includes applying a magnetic field to the metal 3D structure for aligning spins of the metal, where the metal 3D structure is transformed to the magnet. In some approaches, step 208 may include a thermal annealing step in which an external magnetic field is applied during the heating process of the metal 3D structure. As illustrated in FIG. 3C depicting a cross section of a heating process, step 208 may include applying a magnetic field 318 during the conversion process to align the spins in the magnetic particles of the sample in the reducing container 312. In some approaches, the final magnet form may have a net magnetization in the direction of the applied magnetic field 318.

A magnetic field 318 may be applied (N←S) during the annealing process of the sample 302 of metal oxide powder/nanoparticles. In other approaches of step 208 of method 200, the magnetic field 318 may be applied after the heating step 206 of method 200 when the sample 302 of metal oxide powder/nanoparticles has been transformed to a metal.

Various embodiments described herein include a calcium vapor reduction technique that creates near net shape magnets. According to one embodiment, EPD with solutions of nanoparticle magnet precursors may be recycled during the EPD process thereby resulting in near-zero (e.g. less than 0.1%) loss of starting materials.

According to various embodiments, custom shapes of permanent magnets may be created from electrode profiles that may be produced rapidly and inexpensively. EPD can rapidly produce parts with thicknesses of several millimeters. Furthermore, the calcium vapor reduction technique shows promise for producing magnets with room temperature coercivities (which in part determines the energy product) twice as large as magnets produced using traditional methods. Because coercivity declines monotonically with temperature, these additively manufactured magnets may find application at temperatures higher than current industry limits (around 300° C.).

Figure 4A:
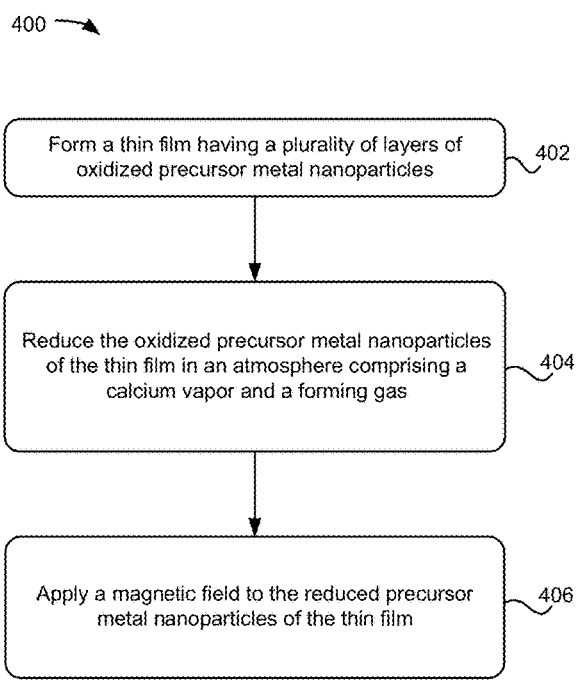
FIG. 4A is a flow chart of a method, according to one embodiment.
Figure 4B:
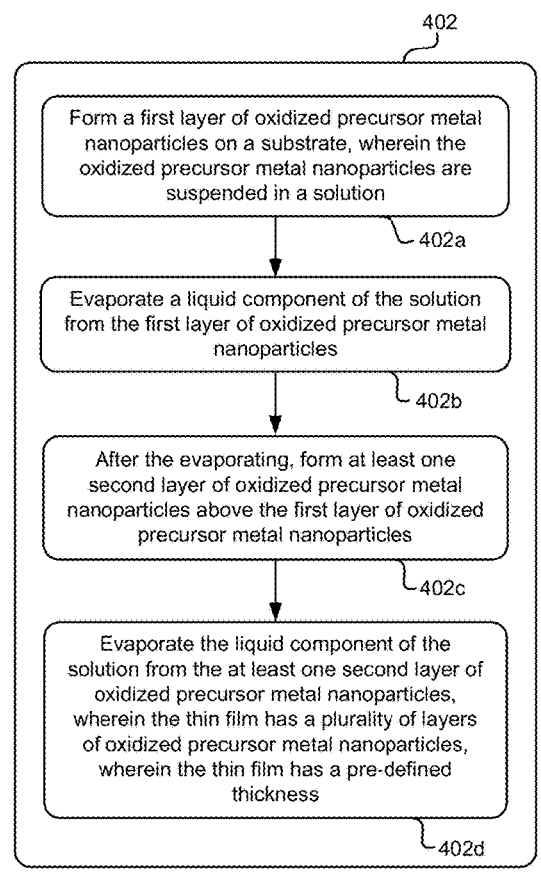
FIG. 4B is a flow chart of step 402 of FIG. 4A.

FIGS. 4A-4B depict a method 400 for forming a thin foil permanent magnet, in accordance with one embodiment. As an option, the present method 400 may be implemented to structures such as those shown in the other FIGS. described herein. Of course, however, this method 400 and others presented herein may be used to form structures for a wide variety of devices and/or purposes which may or may not be related to the illustrative embodiments listed herein. Further, the methods presented herein may be carried out in any desired environment. Moreover, more or less operations than those shown in FIGS. 4A-4B may be included in method 400, according to various embodiments. It should also be noted that any of the aforementioned features may be used in any of the embodiments described in accordance with the various methods.

As illustrated in the flow chart in FIG. 4A, method 400 begins with step 402 of forming a thin foil having a plurality of layers of oxidized precursor metal nanoparticles. As illustrated in FIG. 4B, step 402 may be expanded to include several sub-steps 402a, 402b, 402c, 402d for forming a thin foil having a plurality of layers. The sub-steps 402a, 402b, 402c, 402d may be repeated until a thin foil having a plurality of layers reaches a desired thickness for formation of the thin foil. In various approaches, the precursor metal nanoparticles may be oxidized before forming the first, n layers of precursor metal nanoparticles of the thin foil. In one approach, the oxidized precursor metal nanoparticles may be samarium cobalt oxide. In another approach, the oxidized precursor metal nanoparticles may be neodymium iron boride oxide. In some approaches, the oxidized precursor metal nanoparticles of the first layer may be different from the precursor metal nanoparticles of the second layer. In other approaches, the layers may be formed from the same solution of suspended oxidized precursor metal nanoparticles.

A first sub-step 402a of forming a thin foil having a plurality of layers of oxidized precursor metal nanoparticles includes forming a first layer of oxidized precursor metal nanoparticles on a substrate. In some approaches, the oxidized precursor metal nanoparticles are suspended in a solution. Exemplary examples of an evaporative liquid component of a solution include a nonpolar solvent, polar solvent, or a combination thereof.

In some approaches, step 402a may include methods for forming a layer may include methods such as drop-casting, dripping, etc. a solution of suspended precursor metal nanoparticles onto a substrate. In a preferred approach, forming the n layers of oxidized precursor metal nanoparticles on the substrate includes dropcasting a solution of suspended oxidized precursor metal nanoparticles on the substrate.

In other approaches, step 402a may include forming a layer by electrophoretic deposition of the nanoparticles in an EPD system. In various approaches, electrophoretic deposition using EPD devices not specifically described herein may be chosen, selected, and optimized according to any number of factors, such as size limitations, power requirements, formation time, etc., as would be known by one of skill in the art upon reading the present disclosure.

Step 402b includes evaporating the liquid component of the solution from the first layer of oxidized precursor metal nanoparticles. In various approaches, the conditions for a slow evaporation of the liquid component of the solution of the oxidized precursor metal nanoparticles may depend on the liquid component and the desired thickness of each deposited layer of oxidized precursor metal nanoparticles of the thin foil. For instance, in some approaches of oxidized precursor metal nanoparticles suspended in ethanol, evaporation of liquid component of the solution from a layer of a thin foil structure may involve lyophilization and solvent exchange. In yet other approaches, evaporation of liquid component of the solution from the formed structures of oxidized precursor nanoparticles may involve supercritical extraction.

After the evaporating, step 402c includes forming at least one second layer of oxidized precursor metal nanoparticles above the first layer of oxidized precursor metal nanoparticles.

In preferred approaches, step 402c may include drop-cast subsequent layers of oxidized precursor metal nanoparticles in thicker layers compared to conventional layers of thin foil magnets (e.g. in a range of about 1 micron to about 100 microns). Without wishing to be bound by any theory, it is believed that thicker drop-cast layers may generate increased magnetic properties (e.g. a final thin foil magnet having a high coercivities of at least 60 kOe).

Step 402d includes evaporating the liquid component of the solution from the at least one second layer of oxidized precursor metal nanoparticles.

In further approaches, steps 402c and step 402d to forming n layers of precursor metal nanoparticles on a n−1 layer of evaporated precursor metal nanoparticles for forming a thin foil having a plurality of layers of oxidized precursor metal nanoparticles. In preferred approaches, the formed thin foil may have a pre-defined thickness.

After forming a thin foil having a plurality of layers of precursor metal nanoparticles where the thin foil has achieved a pre-defined thickness, method 400 continues (as illustrated in FIG. 4A) with step 404 of reducing the oxidized precursor metal nanoparticles of the thin foil in an atmosphere comprising a calcium vapor and a gas. In some approaches, the gas may be a forming gas. A thin foil having layers of reduced metal nanoparticle layers may result in a thin foil having layers of metal.

In various approaches, step 404 of reducing the oxidized precursor metal nanoparticles of the formed thin foil includes heating the oxidized precursor metal nanoparticles to a temperature in a range of about 800° C. to about 1000° C. in an atmosphere including a calcium vapor and a forming gas as described herein. In some approaches, the forming gas may be an inert gas mixed with hydrogen gas.

In various approaches, the calcium vapor may be formed from a bed of calcium granules positioned a distance d from the formed thin foil of a plurality of layers of oxidized precursor metal nanoparticles. In some approaches, the distance d is greater than zero millimeters. In preferred approaches, there is no contact between the calcium granules and the plurality of layers of the formed thin foil.

Step 406 includes applying a magnetic field to the reduced precursor metal nanoparticles of the thin foil. The applied magnetic field aligns the plurality of spins of the metal nanoparticles, where the thin foil having layers of metal is transformed to a thin foil magnet.

In some approaches, step 406 may include a thermal annealing step in which an external magnetic field is applied during the heating process of the metal 3D structure. As illustrated in FIG. 3C depicting a cross section of a heating process, step 406 may include applying a magnetic field during the conversion process to align the spins in the magnetic particles such that the final magnet form will have a net magnetization in one direction, according to some approaches.

A magnetic field 318 may be applied (N←S) during the annealing process of the sample 302 of metal oxide powder/nanoparticles. In other approaches of step 406, the magnetic field 318 may be applied after the heating step 406 when the sample 302 of metal oxide powder/nanoparticles has been transformed to a metal.

Experiments

Materials $Sm_xCo_yO_z$ (nominally $SmCo_5O_9$) nanoparticles were custom produced by Nanocerox (Ann Arbor, Mich.). The particles were synthesized using Flame Spray Pyrolysis (FSP) using controlled ratios of Sm and Co salts dissolved in organic solvents. Absolute ethanol was used as received; tetraglyme was purchased from Sigma-Aldrich (St. Louis, Mo.) and used as received. One millimeter thick graphite electrodes were purchased from Ohio Carbon Blank (Willoughby, Ohio). Calcium granules, redistilled, 16 mesh, 99.5% were purchased from Alfa Aesar (Haverhill, Mass.).

Methods

Nanoparticle Deposition: Dropcasting to Form a Thin Magnetic Foil

Suspensions of nanoparticles were prepared by mixing the particles and absolute ethanol to a concentration between 1 and 2 volume % solids or approximately 50 mg/ml particles in ethanol.

A thin magnetic foil was prepared by drop-casting, or repeatedly dripping the solution onto the substrate and allowing the solvent to evaporate until the desired foil thickness is reached. A typical sample surface density (e.g. mass per area) for drop-cast samples was >0.02 g/cm².

Nanoparticle Deposition: Electrophoretic Deposition

Deposition of nanoparticles for thicker free-standing magnets and for near-net shape manufacturing of magnets included the following techniques.

EPD was used to deposit nanoparticles from an ethanol solution (at a concentration of approximately 1 vol %) onto the graphite electrodes. The setup consisted of two graphite electrodes inserted into a stirring bath of the nanoparticles. A power supply was used to apply a voltage across the electrodes. A typical electric field was 40 V/cm. After 5 minutes of deposition, 2-4 mm thick foils were produced on the cathode. To direct the shape of the deposited magnet, the graphite was masked to block the field using electrical tape. To avoid cracking of magnetic foil, different techniques were used to slow the drying process, including lyophilization and solvent exchange.

Nanoparticle Deposition: Molding and Extrusion Additive Manufacturing

For molding and extrusion techniques, a 14 vol % suspension of $SmCo_5O_9$ nanoparticles was mixed with Tetraglyme using a Flacktek centrifugal mixer (Landrum, S. C.) at 3500 rpm for 5 minutes. The resulting shear-thinning paste was applied to silicone rubber molds using a spatula or extruded using a DIW printing system. Using DIW, the ink-loaded syringes were loaded onto a three-axis micropositioning stage (Aerotech, Inc, Pittsburgh, Pa.). A constant displacement drive was used to deliver the ink through nozzle diameters of 250 μm such that the linear feed rate was 3 mm s$^{-1}$. After molding or extrusion of the paste, the part was dried slowly to avoid cracking by covering with a glass petri dish and placed at 90° C. for 3 to 5 days until drying was complete.

Calcium Vapor Reduction of Powder

A one-step process was performed that included sintering and reducing the deposited SmCo oxide materials while retaining their shape. First, calcium granules were placed in the bed of a stainless steel boat. A stainless steel screen was placed above the calcium granules to provide an air gap between the sample sitting on the screen and the molten calcium. The SmCo oxide material, either on a graphite electrode or removed from the substrate was then placed directly on the screen. The boat was then covered loosely with a lid, and loaded into the tube furnace. Forming gas (4% $H_2$ in Ar) was flowed over the sample, and the furnace was heated to a temperature above the melting temperature of calcium (842° C.), typically 875° C. Heating time was varied between 30 minutes and 24 hours. After the desired annealing time, the furnace was shut off and rapidly cooled in order to retain the desired $SmCo_5$ phase. A typical initial cooling rate over the first ten minutes was 40° C. per minute.

Post Processing

For some applications and for characterization it was desirable to remove the calcium oxide from the sintered magnet. The calcium was removed from the monolithic sintered magnets by soaking them overnight in water saturated with bubbling argon gas.

Magnetometer Measurements

The samples were loaded into gelatin capsules partially filled with polyethylene glycol powder, 3350 molecular weight, which was initially heated above its melting point in order to lock the sample in place under applied field.

Figure 5A:
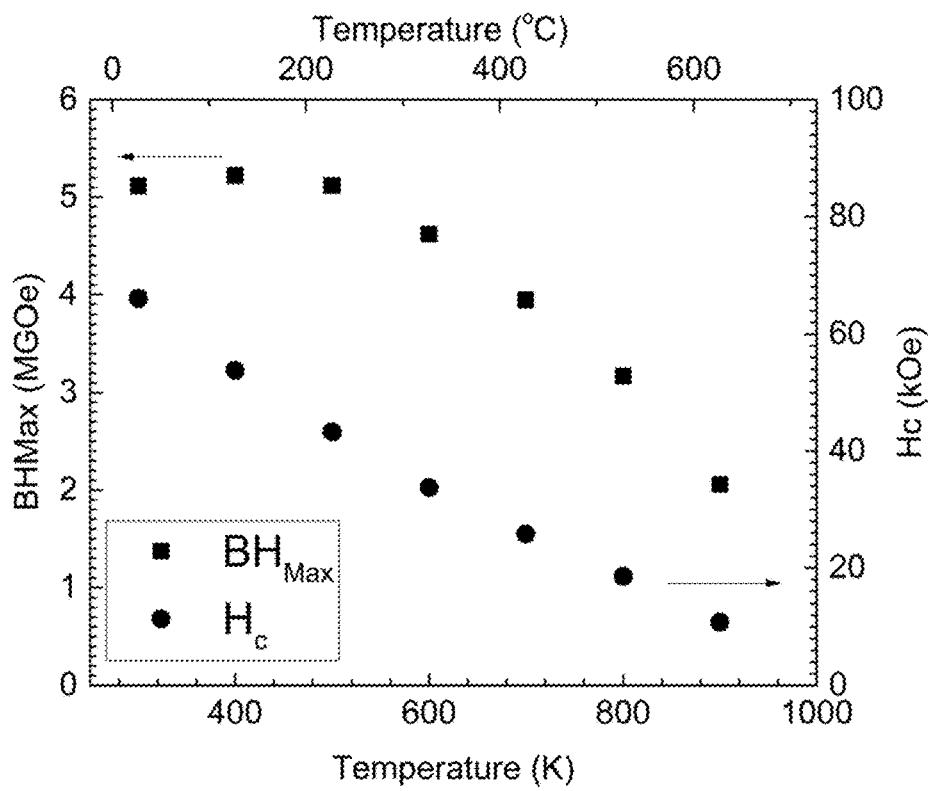
FIG. 5A is a plot of the maximum energy product and magnetic coercivity of magnets formed at various temperatures, according to one embodiment.

FIG. 5A is a plot depicting the maximum energy stored $(BH)_{max}$ (■) and the coercivity $H_c$ (●) of the magnets measured at temperatures ranging from 300 to 1000 kelvins (K) (or 20 to 800° C.), according to various embodiments described herein. As shown, at temperatures up to about 500° C., the magnets had a coercivity above 20 kOe and a (BH)max of greater than 3 MGOe.

Figure 5B:
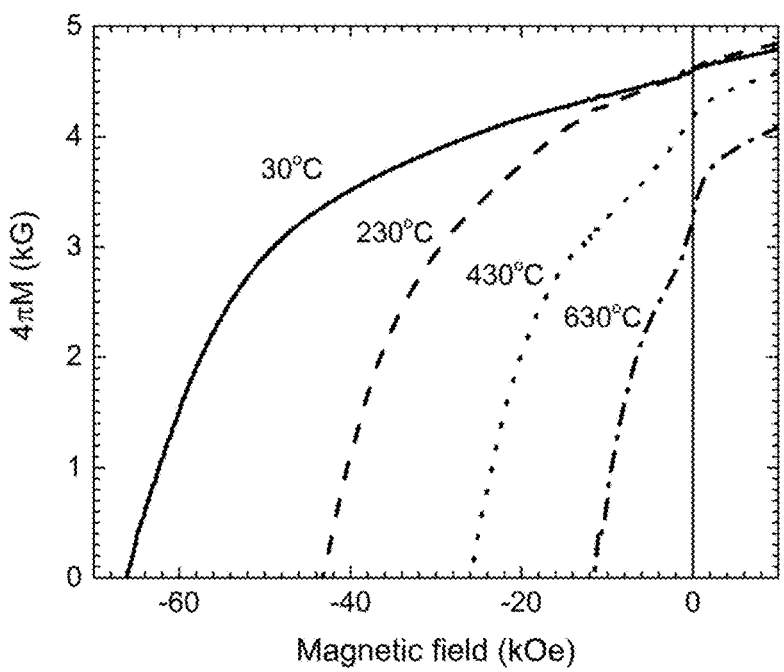
FIG. 5B is a plot of moment compared to magnetic field of magnets formed at various temperatures, according to one embodiment.

FIG. 5B is a plot depicting magnetization (kG) compared to the applied magnetic field (kOe) of a representative magnet formed according to embodiments described herein and measured at a series of increasing temperatures. As shown, the remnant magnetization was constant to at least 230° C., and decreased gradually at higher temperatures. The coercivity exceeded 60 kOe at 30° C. and was still greater than 10 kOe at 630° C. In particular, at higher temperatures, 230° C., 430° C., and 630° C., the magnetization curves were similar to the magnet at 30° C. but with decreasing coercivities.

In Use

Various embodiments described herein use electrophoretic deposition to reduce the amount of metal oxide powders used in metal assembly. Some embodiments describe the manufacture of near net shape permanent magnets. Various embodiments described herein produce small magnets, of millimeter size, thereby providing an advantage in the rapidly expanding market of high performance speakers, compact motors, and magnetically driven actuators.

Some embodiments described herein may produce magnets with room temperature coercivities that are twice as large as magnets produced using traditional methods.

Some embodiments described herein may produce thin strong magnets that may be useful in small motor applications, micro-robotics, etc.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A method of making a permanent magnet, the method comprising:
   forming a three dimensional structure having a predefined geometry, wherein the three dimensional structure comprises oxidized precursor metal particles;
   heating the formed three dimensional structure in an atmosphere comprising a calcium vapor and a gas for reducing the oxidized precursor metal particles of the-formed three dimensional structure; and
   applying a magnetic field to the reduced precursor metal particles, wherein the formed three dimensional structure is transformed to a magnet having the predefined geometry.

2. The method as recited in claim 1, wherein the oxidized precursor metal particles include samarium cobalt oxide.

3. The method as recited in claim 1, wherein the oxidized precursor metal particles include neodymium iron boride oxide.

4. The method as recited in claim 1, wherein forming the three dimensional structure comprises dry pressing a powder of the oxidized precursor metal particles.

5. The method as recited in claim 1, comprising:
   before forming the three dimensional structure, suspending oxidized precursor metal particles in a solution; and
   after forming the three dimensional structure, evaporating a liquid component of the solution from the formed three dimensional structure of oxidized precursor metal particles.

6. The method as recited in claim 5, wherein forming the three dimensional structure comprises electrophoretic deposition of the oxidized precursor metal particles above an electrode.

7. The method as recited in claim 5, wherein forming the three dimensional structure comprises forming a mold of the oxidized precursor metal particles in the solution.

8. The method as recited in claim 5, wherein forming the three dimensional structure comprises extruding an ink comprising the oxidized precursor metal particles onto a substrate.

9. The method as recited in claim 5, wherein the liquid component of the solution is selected from the group consisting of: nonpolar solvent, polar solvent, and a combination thereof.

10. The method as recited in claim 1, wherein heating the oxidized precursor metal particles of the formed three dimensional structure comprises heating the formed three dimensional structure to a temperature in a range of about 800 degrees Celsius to about 1000 degrees Celsius in an atmosphere comprising the calcium vapor and the gas.

11. The method as recited in claim 10, comprising forming the calcium vapor from a bed of calcium granules positioned a distance from the formed three dimensional structure, wherein the distance is greater than zero millimeters.

12. The method as recited in claim 10, wherein the gas is a forming gas.

13. The method as recited in claim 12, wherein the forming gas comprises an inert gas mixed with hydrogen gas.

14. The method as recited in claim 13, wherein the inert gas is selected from the group consisting of: argon and helium.

15. A method of making a thin foil magnet, the method comprising:
   forming a thin foil having a plurality of layers of oxidized precursor metal nanoparticles, the forming of the thin foil comprises:
      forming a first layer of oxidized precursor metal nanoparticles on a substrate, wherein the oxidized precursor metal nanoparticles are suspended in a solution;
      evaporating a liquid component of the solution from the first layer of oxidized precursor metal nanoparticles;
      after the evaporating, forming at least one second layer of oxidized precursor metal nanoparticles above the first layer of oxidized precursor metal nanoparticles; and
      evaporating the liquid component of the solution from the at least one second layer of oxidized precursor metal nanoparticles,
      wherein the thin foil has a plurality of layers of oxidized precursor metal nanoparticles, wherein the thin foil has a pre-defined thickness;
   reducing the oxidized precursor metal nanoparticles of the thin foil in an atmosphere comprising a calcium vapor and a gas; and
   applying a magnetic field to the reduced precursor metal nanoparticles of the thin foil.

16. The method as recited in claim 15, wherein the oxidized precursor metal nanoparticles are selected from the group consisting of: samarium cobalt oxide and neodymium iron boride oxide.

17. The method as recited in claim 15, wherein forming the thin foil comprises forming at least one layer by dropcasting the oxidized precursor metal nanoparticles on the substrate, wherein the oxidized precursor metal nanoparticles are suspended in the solution.

18. The method as recited in claim 15, wherein before the reducing operation, each of the layers of oxidized precursor metal nanoparticles consists essentially of oxidized precursor metal nanoparticles.

19. The method as recited in claim 15, wherein reducing the oxidized precursor metal nanoparticles comprises heating the oxidized precursor metal nanoparticles to a temperature in a range of about 800 degrees Celsius to about 1000 degrees Celsius in an atmosphere comprising the calcium vapor and the gas.

20. The method as recited in claim 15, comprising forming the calcium vapor from a bed of calcium granules positioned a distance from the formed thin foil, wherein the distance is greater than zero millimeters.

21. The method as recited in claim 15, wherein the gas is a forming gas.

22. The method as recited in claim 21, wherein the forming gas is an inert gas mixed with hydrogen gas.

\* \* \* \* \*